United States Patent
Yu et al.

(10) Patent No.: US 6,862,555 B2
(45) Date of Patent: Mar. 1, 2005

(54) ENHANCED PREVENTATIVE MAINTENANCE SYSTEM AND METHOD OF USE

(75) Inventors: Lin Chien Yu, Taipei (TW); Lui-Li Wen, Hsin-Chu (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 64 days.

(21) Appl. No.: 10/306,376

(22) Filed: Nov. 27, 2002

(65) Prior Publication Data

US 2004/0102927 A1 May 27, 2004

(51) Int. Cl.⁷ ................................................ G06F 5/00
(52) U.S. Cl. .................... 702/184; 702/122; 702/123; 702/179
(58) Field of Search .................... 702/81, 108, 122, 702/123, 179, 184, 185, 188; 700/79, 96; 235/51; 709/224; 705/26, 27

(56) References Cited

U.S. PATENT DOCUMENTS 5,311,438 A * 5/1994 Sellers et al. .................. 700/96

2002/0156692 A1 * 10/2002 Squeglia et al. ............... 705/26
2003/0153991 A1 * 8/2003 Visser et al. .................. 700/83
2003/0172002 A1 * 9/2003 Spira et al. .................... 705/27

* cited by examiner

Primary Examiner—Marc S. Hoff
Assistant Examiner—Felix Suarez
(74) Attorney, Agent, or Firm—Tung & Associates

(57) ABSTRACT

The invention provides an enhanced system and method for dynamically generating an accurate preventative maintenance ("PM") schedule for use in an automated facility. The system has a at least one piece of automated equipment, wherein the at least one piece of automated equipment has a plurality of associated parts; a tool performance tracking system ("TP2") in operative communication with the at least one piece of automated equipment to monitor and to analyze data retrieved from the at least one piece of automated equipment; a PM task database for storing a plurality of PM defined tasks; and a PM system, the PM system in operative communication with the TP2 and in further operative communication with the PM task database, wherein the PM system generates a PM schedule for performing PM on the plurality of associated parts.

25 Claims, 2 Drawing Sheets

ENHANCED PREVENTATIVE MAINTENANCE SYSTEM AND METHOD OF USE

FIELD OF THE INVENTION

The present invention relates to an enhanced system and method used to generate an accurate PM schedule in an automated equipment facility

BACKGROUND

Routine maintenance is an important critical task of production management. Currently, preventative maintenance, (hereinafter "PM") is based on a time scale, equipment parameter controls or production output. However, different manufacturing processes perform different usage of components or parts disposed within automated fabrication equipment.

An existing PM method used to perform a PM task in a semiconductor or wafer fabrication facility is shown in FIG. 1. FIG. 1 illustrates a flowchart 10 depicting the PM method of an existing method well known in the PM art. Initially, a PM task is defined (step 12).

Typically, in semiconductor manufacturing plants, two different parameters are used to estimate attrition rates associated with pieces of fabrication equipment. As shown in FIG. 1, the first parameter is based on a time scale, such as 1 week PM or 1 month PM, or after a timed or a plurality of timed processing cycles performed within a piece of fabrication equipment. The second parameter is related to equipment manufacturing data such as equipment output measured according to processed wafer counts or to wafer thickness, or to data relating to the status of a piece of fabrication equipment.

It is difficult to track a piece of fabrication equipment's attrition or rate of wear, or to track an equipment's lifespan when the piece of fabrication equipment is used for several or multiple manufacturing processes. A piece of fabrication equipment's usage is tracked by either determining a time period necessary for replacement of certain parts (step 14), or by determining a piece of fabrication equipment's status (step 16).

The equipment's usage results are then tracked in a PM schedule database (step 18). The PM schedule database is then downloaded into a PM system (PMS), and is then checked against PM criteria to determine wear. Typically the PM criteria define when a PM task should be performed based on data supplied by the part's manufacturer associated with each part disposed within a piece of fabrication equipment. The PM criteria are used to check the physical wear of a part disposed within a piece of fabrication equipment (step 22). The PM criteria and associated PM task is manually entered into an equipment quality system ("EQS") database (step 20), wherein the EQS is in further communication with the PM schedule database to track what PM operation is being performed. Finally, a PM task is executed in accordance with a PM schedule generated by the PM system (step 24).

However, the method as shown in FIG. 1 does not track part usage based on the actual or type use of a part disposed within a piece of fabrication equipment associated with a fabrication process, but instead tracks the overall use of the equipment independent of the part's actual use within the piece of fabrication equipment.

Additionally, the amount of time and frequency each of the parts are used varies according to the recipe being used during each fabrication process or operation. If each part's usage is not tracked according to actual use, then the actual wear of the part cannot be accurately determined.

Using the existing method of FIG. 1 to determine wear of a part disposed within a piece of fabrication equipment, wherein the piece of fabrication has a plurality of parts, and wherein each of the plurality of parts has an associated PM criteria, the PM criteria preferably measured in cycles or time, an accurate measure of the part's wear cannot be determined. For example, in a piece of fabrication equipment, two different operations or processes are performed that each use a different recipe, recipe A and recipe B, respectively. When the piece of fabrication equipment uses recipe A, then a part X, is used may experience T seconds of use, however, if recipe B is used, then part X may be used for 3 T seconds, three times T seconds. The criteria specified by the part X manufacturer may specify a lifetime for part X of 30 hours of use or Y cycles of use. The PM system must then measure the output of the piece of fabrication equipment using both recipe A and recipe B to statistically estimate the actual usage of part X, and thus when a PM needs to be performed on part X. The PM process as shown in FIG. 1 is not an accurate process because the overall output of the equipment is measured, and not the actual usage of part X. To determine actual wear of part X, an actual wear or fatigue inspection must be performed.

By using the existing PM method, such as the method shown in FIG. 1, material waste and supply, or a loss of the stability of a piece of fabrication equipment can also occur when equipment is unexpectedly damaged. To repair the damaged equipment, engineers may perform a premature replacement of parts or components that are normally scheduled to be replaced during a future PM task in accordance with the PM system. Once the prematurely replaced parts are installed, engineers must deviate from the existing PM schedule to estimate future material cost or to estimate an equipment's process quality resulting from use of the replaced parts. Generating an updated PM schedule using existing PM methods is an inexact and cumbersome task.

It is desirable to provide a PM system and method that eliminates the need to physically check for wear of a part disposed within a piece of fabrication equipment.

It is desirable to automatically monitor actual wear of each of plurality of parts disposed within a piece of equipment and to determine each part's actual use.

It is desirable to provide an accurate preventative maintenance schedule that can help automated or fabrication equipment perform more efficiently and produce a stable product yield.

It is desirable to provide a system to track part usage of each of the plurality of parts on a piece of equipment.

It is desirable to provide a system to increase a piece of fabrication equipment and the piece of fabrication equipment associated parts' utility value and to lower overall PM costs.

It is desirable to provide an accurate PM schedule that is adjusted dynamically in accordance with actual wear of a plurality parts disposed.

SUMMARY OF THE INVENTION

The present invention provides an enhanced PM system and method for generating an accurate PM schedule. The system and method of the present invention overcomes the shortcomings of existing PM methods by tracking a part's actual usage. Thus, a plurality of parts disposed within a piece of fabrication equipment that are used differently for each process performed are accurately tracked by each part's actual lifetime.

The enhanced system of the present invention provides at least one piece of automated equipment, wherein the at least one piece of automated equipment has a plurality of associated parts; a tool performance tracking system ("TP2") in operative communication with the at least one piece of automated equipment to monitor and to analyze data retrieved from the at least one piece of automated equipment; a PM task database for storing a plurality of PM defined tasks; and a PM system, the PM system in operative communication with the TP2 and in further operative communication with the PM task database, wherein the PM system generates a PM schedule for performing PM on the plurality of associated parts.

Additionally, the plurality of PM defined tasks are performed in accordance with predefined PM criteria on the at least one piece of automated equipment. The PM schedule dynamically changes in accordance with the monitored and analyzed TP2 data retrieved from the at least one piece of automated equipment.

A method of use of the enhanced PM system is also provided. The PM method is used for generating a PM schedule for an automated facility and has the steps of providing at least one piece of automated equipment, wherein the at least one piece of automated equipment has a plurality of associated parts; providing a tool performance tracking system ("TP2") in operative communication with the at least one piece of automated equipment to monitor and to analyze data retrieved from the at least one piece of automated equipment; providing a PM task database for storing a plurality of PM defined tasks; and providing a PM system, the PM system in operative communication with the TP2 and in further operative communication with the PM task database, wherein the PM system generates a PM schedule for performing PM on the plurality of associated parts.

A parts measurement rule is used for recording and analyzing every defined state time for each of the plurality of associated parts disposed within the at least one piece of automated equipment, wherein the defined state time is the measured usage for each of the plurality of parts associated with each process performed within the associated at least one piece of automated equipment. Every defined state time is preferably stored in a parts measurement rule database and is then communicated from the parts measurement rule database to the TP2. The TP2 then calculates a real-time value associated with each of the plurality of associated parts indicating actual usage of each of the plurality of associated parts. The real-time values are associated with each of the plurality of associated parts to calculate an average parts attrition rate, wherein the average parts attrition rate is an average utilization time of parts in a period of time.

Each average parts attrition rate is then used to determine an attrition time associated for each of the plurality of associated parts, wherein the attrition time is a part's lifespan. Preferably, the attrition time associated with each of the plurality of associated parts is communicated from the TP2 to the PM system; and the plurality of PM defined tasks are also communicated to the PM system. The plurality of PM defined tasks are performed in accordance with predefined PM criteria associated with each of the plurality of associated parts, wherein the predefined PM criteria defines when a PM task should be performed based on a part manufacturer's data associated with each of the plurality of associated parts.

Both the attrition time associated for each of the plurality of associated parts and the PM defined tasks that were communicated to the PM system are used to generate the PM schedule, wherein the PM schedule changes dynamically in accordance with each variance associated with each attrition time and each of the plurality of PM defined tasks. The plurality of defined PM tasks are then executed in accordance with the dynamically generated PM schedule.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENTS

Generally, the present system and method provides an automatic processing monitor tool and defines a parts measurement rule for each part disposed within a piece of fabrication equipment; uses a tool monitor mechanism to record and analyze a material attrition rate; and dynamically adjusts part usage and generates a PM schedule associated with a part's lifespan.

The present invention provides execution of a PM schedule based on each part disposed within a piece of fabrication equipment's lifespan. The present system and method reduces the cost of spare parts and improves the efficacy of parts used in an automated facility or fabrication facility. The present system and method merges a tool tracking system with a preventative maintenance system.

The tool tracking system is used to analyze and record each part's usage rate during processing and arranges an accurate and a dynamic PM schedule between parts and equipment by taking each part's lifespan into consideration. The present invention creates an improved PM schedule to determine when PM needs to be executed independent of fatigue or wear inspections.

A tool monitoring mechanism is used to analyze and record each part's attrition or wear rate during processing. Thus, an accurate PM schedule can be generated according to both a part's lifespan and a part's attrition time. Utilizing the best utility rate of automated equipment, and thereby increasing the automated equipment's output quantity can save costs.

Figure 2:
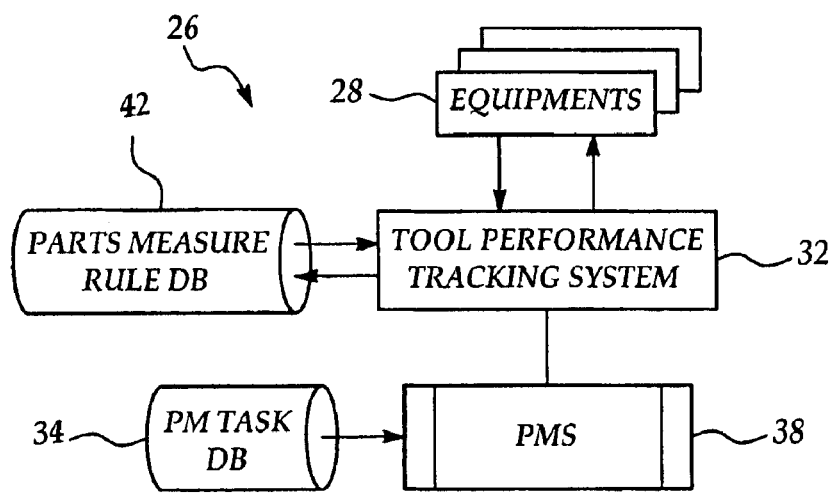
FIG. 2 is a block diagram of an enhanced preventative maintenance system in accordance with a preferred embodiment of the present invention.

Referring now to the drawings, FIG. 2 shows a preferred embodiment of a system 26 for generating a PM schedule for an automated facility having at least one piece of automated equipment 28, wherein the at least one piece of automated equipment 28 has a plurality of associated parts 30 (not shown);

a tool performance tracking system ("TP2") 32 in operative communication with the at least one piece of automated equipment 28 to monitor and to analyze data retrieved from the at least one piece of automated equipment 28; a PM task database 34 for storing a plurality of PM defined tasks 36 (not shown); and a PM system (PMS) 38, the PM system 38 in operative communication with the TP2 32 and in further operative communication with the PM task database 34, wherein the PM system 38 generates a PM schedule 40 (not shown) for performing PM on the plurality of associated parts 30.

Preferably, the automated facility is a wafer fabrication or a semiconductor manufacturing facility. However, the above is not intended as limiting, and the present system could be used in any automated facility having at least one piece of automated equipment or a plurality of automated equipment. Additionally, communications between the at least one piece of automated equipment 28 having the plurality of associated parts 30, the TP2 32, the PM task database 34, the PMS 38, and the PM system 38 may be employed, such as wires, cables (e.g., a coaxial cable), busses, radio frequency or other electromagnetic means, or otherwise.

The present system 26 utilizes the tool performance tracking system (TP2) 32 to provide a mechanism for recording and evaluating every defined state time for each or the plurality of associated parts 30 disposed within the at least one piece of automated fabrication equipment 28, wherein the defined state time or parts measurement rule is the measured usage for each of the plurality of associated part 30 used for each process performed within the at least one associated piece of automated equipment 28. The defined state time is determined by recording for each of the plurality of associated part's 30 usage based on a triggering event, the triggering event having a start and an end condition. The measurement is performed using software supplied by the at least one piece of automated equipment's 28 supplier or manufacturer, preferably the software used to communicate between the TP2 32 and the at least one piece of automated equipment 28 is a protocol software such as SECS II. It should be noted that the TP2 32 preferably, has a CPU to run the protocol software and to perform calculations, and a data acquisition device, as is well known in the data acquisition arts, for recording, monitoring, and analyzing data retrieved from the at least one piece of automated equipment 28.

The present system 26, preferably, has a parts measurement rule database 42 in operative communication with the TP2 32. A parts measurement rule associated with a defined state time for each part and associated processing operation is stored in the parts measurement rule database, wherein the parts measurement rule database is in operative communication with the TP2.

The TP2 32 tracks each of the plurality of associated parts disposed within the at least one piece of automated equipment's actual usage in accordance with a particular operation being performed and an associated recipe being used within the at least one piece of fabrication equipment 28. Accordingly, for different types of production processes performed, different usage rates of parts will occur.

In a preferred embodiment, the present system 26, uses a part C (not shown) for t minutes when performing a recipe A, and uses part C for 2t, two times t minutes when performing recipe B, wherein part C is one of the plurality of associated parts 30 disposed within at least one piece of automated equipment 28. Thus, a plurality of part measurement rules for part C are defined in the parts measurement rule database 42, wherein each parts measurement rule defines all state times for all operations in accordance with associated recipes, A and B, respectively, performed by part C. The TP2 32 then uses the plurality of parts measurement rules to calculate a real-time value indicating actual usage of part C.

The TP2 32 further calculates an average parts attrition rate for part C, wherein the average parts attrition rate is an average utilization time of parts in a period of time. The TP2 32 uses the parts measurement rule and the average parts attrition rate to determine an attrition time or lifespan associated for part C and for each of the plurality of associated parts 30. The attrition time for each of the plurality of associated parts is communicated to the PMS 38 to generate a PM schedule according to each part's lifespan. Additionally, each PM activity performed is dependent on an actual utilized time of each of the plurality of associated parts 30 in a period of time. Based on the capacity utilization status, the PM schedule will be changed to reflect the situation.

The plurality of PM defined tasks 36 are initially defined and are stored in the PM task database 34. The plurality of PM defined tasks 36 are then evaluated according to predefined PM criteria associated with each of the plurality of associated parts 30. The predefined PM criteria defines when a PM task should be performed, based on the part manufacturer's data associated with each of the plurality of parts associated with the at least one piece of fabrication equipment on the at least one piece of automated equipment. However, the PM criteria may be any relevant wear or fatigue data or specifications relating to a part, and is not limited to manufacturer specified data. After the criteria has been evaluated, the results are sent to the PMS 38. The PMS 38 then generates a PM schedule, and PM tasks are executed in accordance with the PM schedule.

Thus, in accordance with a variation in a parts attrition time and the defined PM task, the PMS will be able to adjust the PM schedule dynamically. Based on capacity of utilization status for each of the plurality of associated parts 30, the PM schedule can be changed to reflect real-time usage. Thus, the PMS can adjust the PM schedule to dynamically perform PM changes in accordance with the monitored and analyzed TP2 data retrieved from the at least one piece of automated equipment and from the plurality of PM defined tasks.

Figure 3:
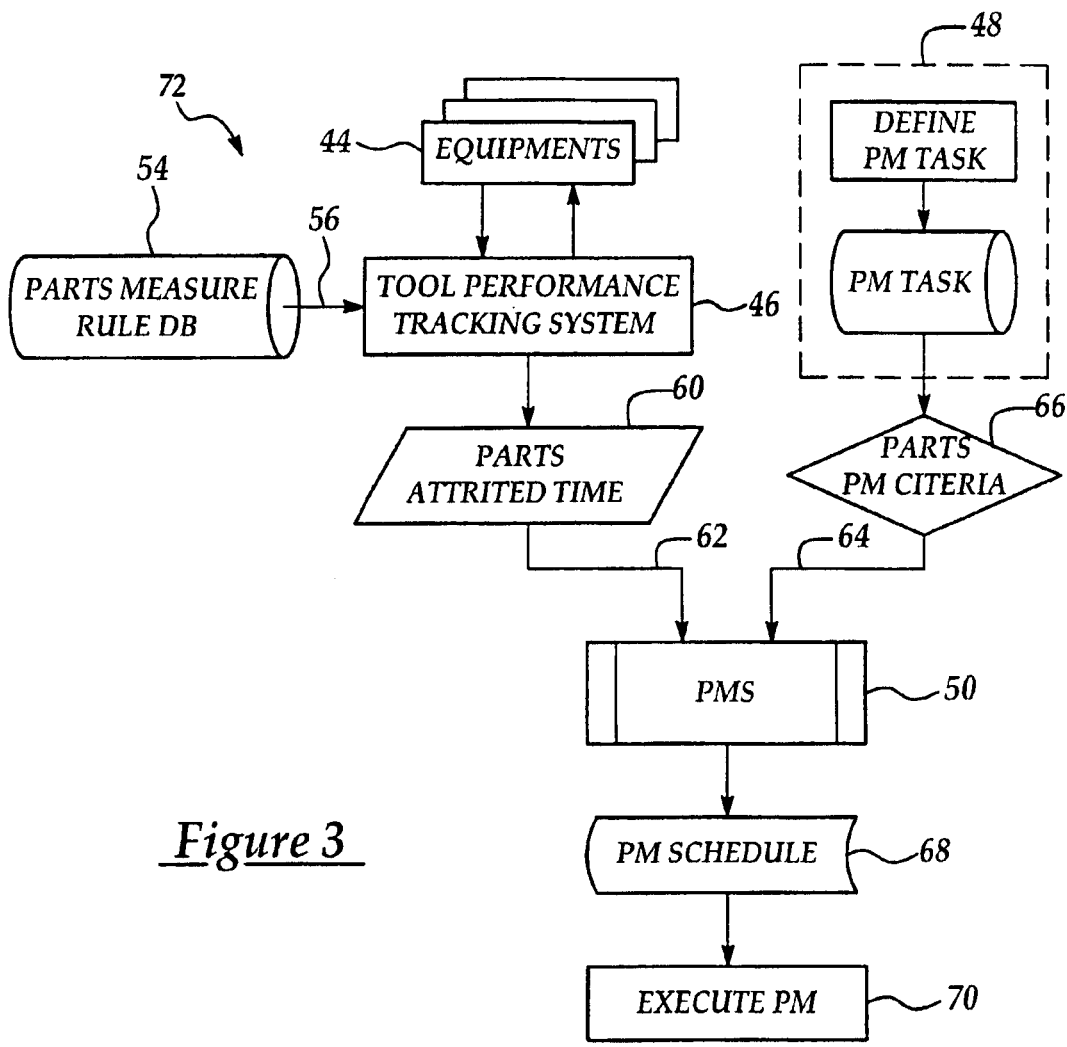
FIG. 3 is a flowchart showing an enhanced preventative maintenance method for use in an automated equipment facility in accordance with a preferred embodiment of the present invention.

As shown in FIG. 3, an improved PM method 72 for generating a PM schedule for an automated facility is depicted in a flowchart of the present invention. The PM method 72 for generating a PM schedule for an automated facility having the steps of providing at least one piece of automated equipment (step 44), wherein the at least one piece of automated equipment has a plurality of associated parts; providing a tool performance tracking system ("TP2") in operative communication with the at least one piece of automated equipment to monitor and to analyze data retrieved from the at least one piece of automated equipment (step 46); providing a PM task database for storing a plurality of PM defined tasks (step 48); and providing a PM system (step 50), the PM system in operative communication with the TP2 and in further operative communication with the PM task database, wherein the PM system generates a PM schedule for performing PM on the plurality of associated parts (step 52).

A parts measurement rule is used for recording and analyzing every defined state time for each of the plurality of associated parts disposed within the at least one piece of automated equipment, wherein the defined state time is the measured usage for each of the plurality of parts associated with each process performed within the associated at least one piece of automated equipment. Each defined state time is preferably stored in a parts measurement rule database (step 54) and each defined state time is then communicated from the parts measurement rule database to the TP2 (step 56). The TP2 then calculates a real-time value associated with each of the plurality of associated parts indicating actual usage of each of the plurality of associated parts (sub-step 58, not shown). The real-time values are associated with each of the plurality of associated parts to calculate an average parts attrition rate, wherein the average parts attrition rate is an average utilization time of parts in a period of time.

Each average parts attrition rate is then used to determine an attrition time associated for each of the plurality of associated parts, wherein the attrition time is a part's lifespan (step 60). Preferably, the attrition time associated with each of the plurality of associated parts is communicated from the TP2 to the PM system (step 62); and the plurality of PM defined tasks are also communicated to the PM system (step 64). The plurality of PM defined tasks are performed in accordance with predefined PM criteria associated with each of the plurality of associated parts, wherein the predefined PM criteria defines when a PM task should be performed based on a part manufacturer's data associated with each of the plurality of associated parts (step 66).

Both the attrition time associated for each of the plurality of associated parts and the PM defined tasks that were communicated to the PM system are used to generate the PM schedule (step 68), wherein the PM schedule changes dynamically in accordance with each variance associated with each attrition time and each of the plurality of PM defined tasks. The plurality of defined PM tasks are then executed in accordance with the dynamically generated PM schedule (step 70).

Figure 1:
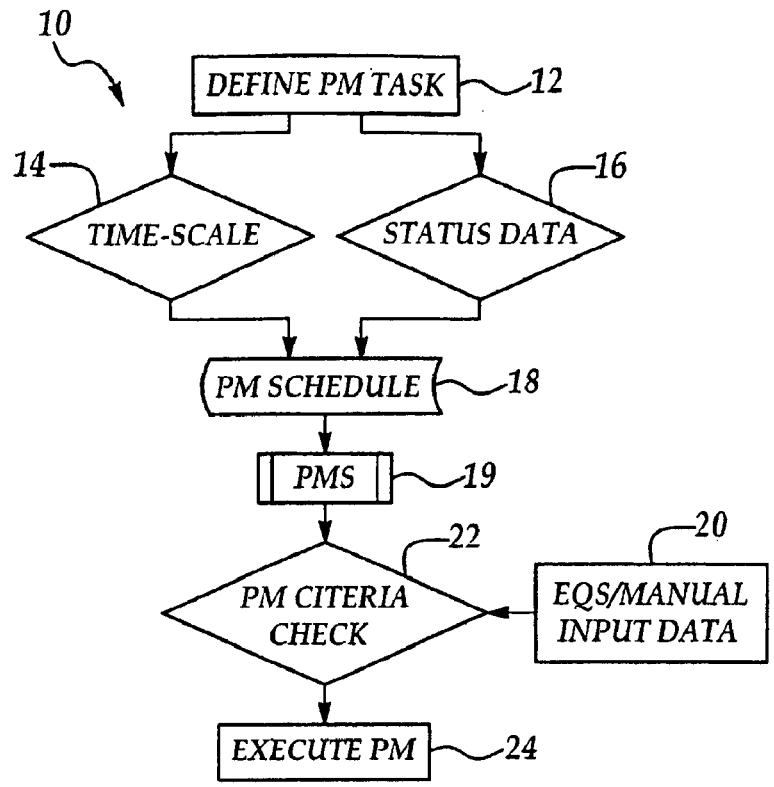
FIG. 1 is a flowchart showing a method of use of an existing preventative maintenance system.

From the foregoing, it should be appreciated that a system and method are provided for a PM system and method used to generate an accurate PM schedule in an automated equipment facility. The system and method of the present invention overcomes the shortcomings of existing PM methods as shown in FIG. 1 by tracking a part's actual usage. Thus, a plurality of parts disposed within a piece of fabrication equipment that are used differently for each process performed are accurately tracked by each part's actual lifetime.

While a preferred exemplary embodiment has been presented in the foregoing detailed description, it should be understood that a vast number of variations exist and this preferred exemplary embodiment is merely an example, and it is not intended to limit the scope, applicability or configuration of the invention in any way. Rather, the foregoing detailed description provides those of ordinary skill in the art with a convenient guide for implementing a preferred embodiment of the invention and various changes can be made in the function and arrangements of the exemplary embodiment without departing from the spirit and scope of the appended claims.

What is claimed is:

1. An enhanced system for use in generating a PM (preventative maintenance) schedule for an automated equipment facility comprising:

at least one piece of automated equipment, wherein the at least one piece of automated equipment has a plurality of associated parts;

a tool performance tracking system ("TP2") in operative communication with the at least one piece of automated equipment to monitor, to analyze attrition rate data, and to determine an attrition time associated for each of the plurality of associated parts retrieved from the at least one piece of automated equipment;

a PM task database for storing a plurality of PM defined tasks; and a PM system, the PM system in operative communication with the TP2 and in further operative communication with the PM task database, wherein the PM system generates a PM schedule based on the attrition time associated for each of the plurality of associated parts and the plurality of PM defined tasks for performing PM on the plurality of associated parts.

2. The enhanced system of claim 1, wherein the plurality of PM defined tasks are performed in accordance with predefined PM criteria on the at least one piece of automated equipment.

3. The enhanced system of claim 1, wherein the PM schedule dynamically changes in accordance with the monitored and analyzed TP2 data retrieved from the at least one piece of automated equipment.

4. A PM method for generating a PM schedule for an automated equipment facility comprising the steps of:

providing at least one piece of automated equipment, wherein the at least one piece of automated equipment has a plurality of associated parts;

providing a tool performance tracking system ("TP2") in operative communication with the at least one piece of automated equipment to monitor, to analyze attrition rate data, and to determine an attrition time associated for each of the plurality of associated parts retrieved from the at least one piece of automated equipment;

providing a PM task database for storing a plurality of PM defined tasks; and providing a PM system, the PM system in operative communication with the TP2 and in further operative communication with the PM task database, wherein the PM system generates a PM schedule based on the attrition time associated for each of the plurality of associated parts and the plurality of PM defined tasks for performing PM on the plurality of associated parts.

5. The method of claim 4 further comprising the steps of:

using a parts measurement rule for recording and analyzing every defined state time for each of the plurality of associated parts disposed within the at least one piece of automated equipment, wherein the defined state time is the measured usage for each of the plurality of parts associated with each process performed within the associated at least one piece of automated equipment.

6. The method of claim 5 further comprising the step of:

storing each defined state time in a parts measurement rule database.

7. The PM method of claim 6 further comprising the steps of:

communicating the plurality of defined state times from the parts measurement rule database to the TP2; and calculating a real-time value associated with each of the plurality of associated parts indicating actual usage of each of the plurality of associated parts.

8. The PM method of claim 7 further comprising the step of:

using the real-time value associated with each of the plurality of associated parts to calculate an average parts attrition rate, wherein the average parts attrition rate is an average utilization time of parts in a period of time.

9. The PM method of claim 8 comprising the step of:
using the average parts attrition rate associated with each of the plurality of associated parts to determine the attrition time associated for each of the plurality of associated parts, wherein the attrition time is a part's lifespan.

10. The PM method of claim 9 further comprising the step of:
communicating the attrition time associated with each of the plurality of associated parts from the TP2 to the PM system;
communicating the plurality of PM defined tasks to the PM system, wherein the plurality of PM defined tasks are performed in accordance with predefined PM criteria associated with each of the plurality of associated parts; and
using the attrition time associated for each of the plurality of associated parts and PM defined tasks communicated to the PM system to generate the PM schedule, wherein the PM schedule changes dynamically in accordance with each variance associated with each attrition time and each of the plurality of PM defined tasks.

11. The PM method of claim 10, wherein the predefined PM criteria defines when a PM task should be performed based on a part manufacturer's data associated with each of the plurality of associated parts.

12. The PM method of claim 10 further comprising the step of:
executing a PM task in accordance with the dynamically generated PM schedule.

13. A PM method for generating a PM schedule for an automated wafer fabrication facility comprising the steps of:
providing a plurality of wafer fabrication equipment, wherein each of the plurality of wafer fabrication equipment has a plurality of associated parts;
providing a tool performance tracking system ("TP2") in operative communication with the plurality of wafer fabrication equipment to monitor, to analyze data attrition rate data retrieved from the plurality of wafer fabrication equipment;
using the attrition rate date to determine an attrition time associated for each of the plurality of associated parts; and
providing a PM system, the PM system in operative communication with the TP2 and in further operative communication with the PM task database, wherein the PM system generates a PM schedule based on the attrition time associated for each of the plurality of associated parts and the plurality of PM defined tasks for performing PM on the plurality of associated parts.

14. The method of claim 13 further comprising the steps of:
using a parts measurement rule for recording and analyzing every defined state time for each of the plurality of associated parts disposed within the plurality of wafer fabrication equipment, wherein the defined state time is the measured usage for each of the plurality of parts associated with each process performed within the associated plurality of wafer fabrication equipment.

15. The method of claim 14 further comprising the step of:
storing each defined state time in a parts measurement rule database.

16. The PM method of claim 15 further comprising the steps of:
communicating the plurality of defined state times from the parts measurement rule database to the TP2; and
calculating a real-time value associated with each of the plurality of associated parts indicating actual usage of each of the plurality of associated parts.

17. The PM method of claim 16 further comprising the step of:
using the real-time value associated with each of the plurality of associated parts to calculate an average parts attrition rate, wherein the average parts attrition rate is an average utilization time of parts in a period of time.

18. The PM method of claim 17 wherein the step of using the attrition rate date to determine an attrition time associated for each of the plurality of associated parts further comprises the step of:
using the average parts attrition rate associated with each of the plurality of associated parts; and wherein the attrition time is a part's lifespan.

19. The PM method of claim 18 further comprising the step of:
communicating the attrition time associated with each of the plurality of associated parts from the TP2 to the PM system;
communicating the plurality of PM defined tasks to the PM system, wherein the plurality of PM defined tasks are performed in accordance with predefined PM criteria associated with each of the plurality of associated parts;
using the attrition time associated for each of the plurality of associated parts and PM defined tasks communicated to the PM system to generate the PM schedule, wherein the PM schedule changes dynamically in accordance with each variance associated with each attrition time and each of the plurality of PM defined tasks; and
executing a PM task in accordance with the dynamically generated PM schedule.

20. The PM method of claim 19, wherein the predefined PM criteria defines when a PM task should be performed based on a part manufacturer's data associated with each of the plurality of associated parts.

21. A PM method for generating a PM schedule for an automated equipment facility comprising the steps of:
providing at least one piece of automated equipment, wherein the at least one piece of automated equipment has a plurality of associated parts;
providing a tool performance tracking system ("TP2") in operative communication with the at least one piece of automated equipment to monitor and to analyze data retrieved from the at least one piece of automated equipment;
providing a PM task database for storing a plurality of PM defined tasks; and
providing a PM system, the PM system in operative communication with the TP2 and in further operative communication with the PM task database, wherein the PM system generates a PM schedule for performing PM on the plurality of associated parts;
using a parts measurement rule for recording and analyzing every defined state time for each of the plurality of associated parts disposed within the at least one piece of automated equipment, wherein the defined state time is the measured usage for each of the plurality of parts associated with each process performed within the associated at least one piece of automated equipment;
storing each defined state time in a parts measurement rule database;

communicating the plurality of defined state times from the parts measurement rule database to the TP2;

calculating a real-time value associated with each of the plurality of associated parts indicating actual usage of each of the plurality of associated parts;

using the real-time value associated with each of the plurality of associated parts to calculate an average parts attrition rate, wherein the average parts attrition rate is an average utilization time of parts in a period of time; and using the average parts attrition rate associated with each of the plurality of associated parts to determine an attrition time associated for each of the plurality of associated parts, wherein the attrition time is a part's lifespan.

22. A PM method for generating a PM schedule for an automated equipment facility comprising the steps of:

providing at least one piece of automated equipment, wherein the at least one piece of automated equipment has a plurality of associated parts;

providing a tool performance tracking system ("TP2") in operative communication with the at least one piece of automated equipment to monitor and to analyze data retrieved from the at least one piece of automated equipment;

providing a PM task database for storing a plurality of PM defined tasks; and providing a PM system, the PM system in operative communication with the TP2 and in further operative communication with the PM task database, wherein the PM system generates a PM schedule for performing PM on the plurality of associated parts;

using a parts measurement rule for recording and analyzing every defined state time for each of the plurality of associated parts disposed within the at least one piece of automated equipment, wherein the defined state time is the measured usage for each of the plurality of parts associated with each process performed within the associated at least one piece of automated equipment;

storing each defined state time in a parts measurement rule database;

communicating the plurality of defined state times from the parts measurement rule database to the TP2;

calculating a real-time value associated with each of the plurality of associated parts indicating actual usage of each of the plurality of associated parts;

using the real-time value associated with each of the plurality of associated parts to calculate an average parts attrition rate, wherein the average parts attrition rate is an average utilization time of parts in a period of time;

using the average parts attrition rate associated with each of the plurality of associated parts to determine an attrition time associated for each of the plurality of associated parts, wherein the attrition time is a part's lifespan;

communicating the attrition time associated with each of the plurality of associated parts from the TP2 to the PM system;

communicating the plurality of PM defined tasks to the PM system, wherein the plurality of PM defined tasks are performed in accordance with predefined PM criteria associated with each of the plurality of associated parts; and using the attrition time associated for each of the plurality of associated parts and PM defined tasks communicated to the PM system to generate the PM schedule, wherein the PM schedule changes dynamically in accordance with each variance associated with each attrition time and each of the plurality of PM defined tasks.

23. A PM method for generating a PM schedule for an automated wafer fabrication facility comprising the steps of:

providing a plurality of wafer fabrication equipment, wherein each of the plurality of wafer fabrication equipment has a plurality of associated parts;

providing a tool performance tracking system ("TP2") in operative communication with the plurality of wafer fabrication equipment to monitor and to analyze data retrieved from the plurality of wafer fabrication equipment;

providing a PM task database for storing a plurality of PM defined tasks; and providing a PM system, the PM system in operative communication with the TP2 and in further operative communication with the PM task database, wherein the PM system generates a PM schedule for performing PM on the plurality of associated parts;

using a parts measurement rule for recording and analyzing every defined state time for each of the plurality of associated parts disposed within the plurality of wafer fabrication equipment, wherein the defined state time is the measured usage for each of the plurality of parts associated with each process performed within the associated plurality of wafer fabrication equipment;

storing each defined state time in a parts measurement rule database;

communicating the plurality of defined state times from the parts measurement rule database to the TP2;

calculating a real-time value associated with each of the plurality of associated parts indicating actual usage of each of the plurality of associated parts;

using the real-time value associated with each of the plurality of associated parts to calculate an average parts attrition rate, wherein the average parts attrition rate is an average utilization time of parts in a period of time; and using the average parts attrition rate associated with each of the plurality of associated parts to determine an attrition time associated for each of the plurality of associated parts, wherein the attrition time is a part's lifespan.

24. A PM method for generating a PM schedule for an automated wafer fabrication facility comprising the steps of:

providing a plurality of wafer fabrication equipment, wherein each of the plurality of wafer fabrication equipment has a plurality of associated parts;

providing a tool performance tracking system ("TP2") in operative communication with the plurality of wafer fabrication equipment to monitor and to analyze data retrieved from the plurality of wafer fabrication equipment;

providing a PM task database for storing a plurality of PM defined tasks;

providing a PM system, the PM system in operative communication with the TP2 and in further operative communication with the PM task database, wherein the PM system generates a PM schedule for performing PM on the plurality of associated parts;

using a parts measurement rule for recording and analyzing every defined state time for each of the plurality of associated parts disposed within the plurality of wafer fabrication equipment, wherein the defined state time is the measured usage for each of the plurality of parts associated with each process performed within the associated plurality of wafer fabrication equipment;

storing each defined state time in a parts measurement rule database;

communicating the plurality of defined state times from the parts measurement rule database to the TP2;

calculating a real-time value associated with each of the plurality of associated parts indicating actual usage of each of the plurality of associated parts;

using the real-time value associated with each of the plurality of associated parts to calculate an average parts attrition rate, wherein the average parts attrition rate is an average utilization time of parts in a period of time;

using the average parts attrition rate associated with each of the plurality of associated parts to determine an attrition time associated for each of the plurality of associated parts, wherein the attrition time is a part's lifespan;

communicating the attrition time associated with each of the plurality of associated parts from the TP2 to the PM system;

communicating the plurality of PM defined tasks to the PM system, wherein the plurality of PM defined tasks are performed in accordance with predefined PM criteria associated with each of the plurality of associated parts;

using the attrition time associated for each of the plurality of associated parts and PM defined tasks communicated to the PM system to generate the PM schedule, wherein the PM schedule changes dynamically in accordance with each variance associated with each attrition time and each of the plurality of PM defined tasks; and executing a PM task in accordance with the dynamically generated PM schedule.

25. A Preventative Maintenance (PM) method for generating a PM schedule for an automated equipment facility comprising the steps of:

providing at least one piece of automated equipment, wherein the at least one piece of automated equipment has a plurality of associated parts; and using both an attrition time associated for each of the plurality of associated parts and a plurality of PM defined tasks to generate a PM schedule, wherein the PM schedule changes dynamically in accordance with each variance associated with each attrition time and each of the plurality of PM defined tasks.

* * * * *